United States Patent [19]

Lliteras

[11] 4,037,514
[45] July 26, 1977

[54] HIGH TORQUE FASTENER HEAD

[76] Inventor: Juan Andres Lliteras, 6146 Beachway Drive, Falls Church, Va. 22041

[21] Appl. No.: 660,534

[22] Filed: Feb. 23, 1976

[51] Int. Cl.² ............................................. F16B 23/00
[52] U.S. Cl. ...................................... 85/45; 145/50 A
[58] Field of Search .................. 85/9 R, 45; 145/50 A

[56] References Cited

U.S. PATENT DOCUMENTS

| | | | |
|---|---|---|---|
| 379,200 | 3/1888 | Hanlon | 85/45 |
| 1,088,046 | 2/1914 | Turner | 85/45 |
| 2,182,568 | 12/1939 | Olson | 85/45 |
| 2,322,509 | 6/1943 | De Vellier | 85/45 |
| 2,338,024 | 12/1943 | Bugg | 145/50 A X |
| 2,384,264 | 9/1945 | Schlueter | 85/45 |
| 2,394,104 | 2/1946 | Rankin | 85/45 UX |
| 2,418,960 | 4/1947 | Todd | 85/45 |
| 2,677,985 | 5/1954 | Vaughn | 85/45 |
| 2,808,087 | 10/1957 | Vaughn | 85/45 X |
| 3,212,392 | 10/1965 | Wald | 85/45 |
| 3,331,274 | 6/1967 | Walton | 85/45 |
| 3,540,342 | 11/1970 | Vaughn | 85/45 |
| 3,808,937 | 5/1974 | Roehrig | 85/45 |
| 3,872,904 | 3/1975 | Barlow | 85/45 X |
| 3,874,258 | 4/1975 | Semola et al. | 85/45 X |

FOREIGN PATENT DOCUMENTS

| | | | |
|---|---|---|---|
| 954,633 | 6/1949 | France | 85/45 |
| 182,174 | 8/1906 | Germany | 85/45 |
| 186,146 | 5/1905 | Germany | 145/50 A |
| 463,313 | 4/1951 | Italy | 85/45 |

*Primary Examiner*—Roy D. Frazier
*Assistant Examiner*—Thomas J. Holko
*Attorney, Agent, or Firm*—Jim Zegeer

[57] ABSTRACT

There is disclosed a novel high torque fastener head for screwdriver type fasteners wherein the head has formed therein an arcuate slot transverse to and intersecting the longitudinal axis of the fastener. The shape of the slot is such as to avoid damage to the head when torquing or drive forces are applied by a driving implement.

5 Claims, 10 Drawing Figures

U.S. Patent
July 26, 1977
4,037,514
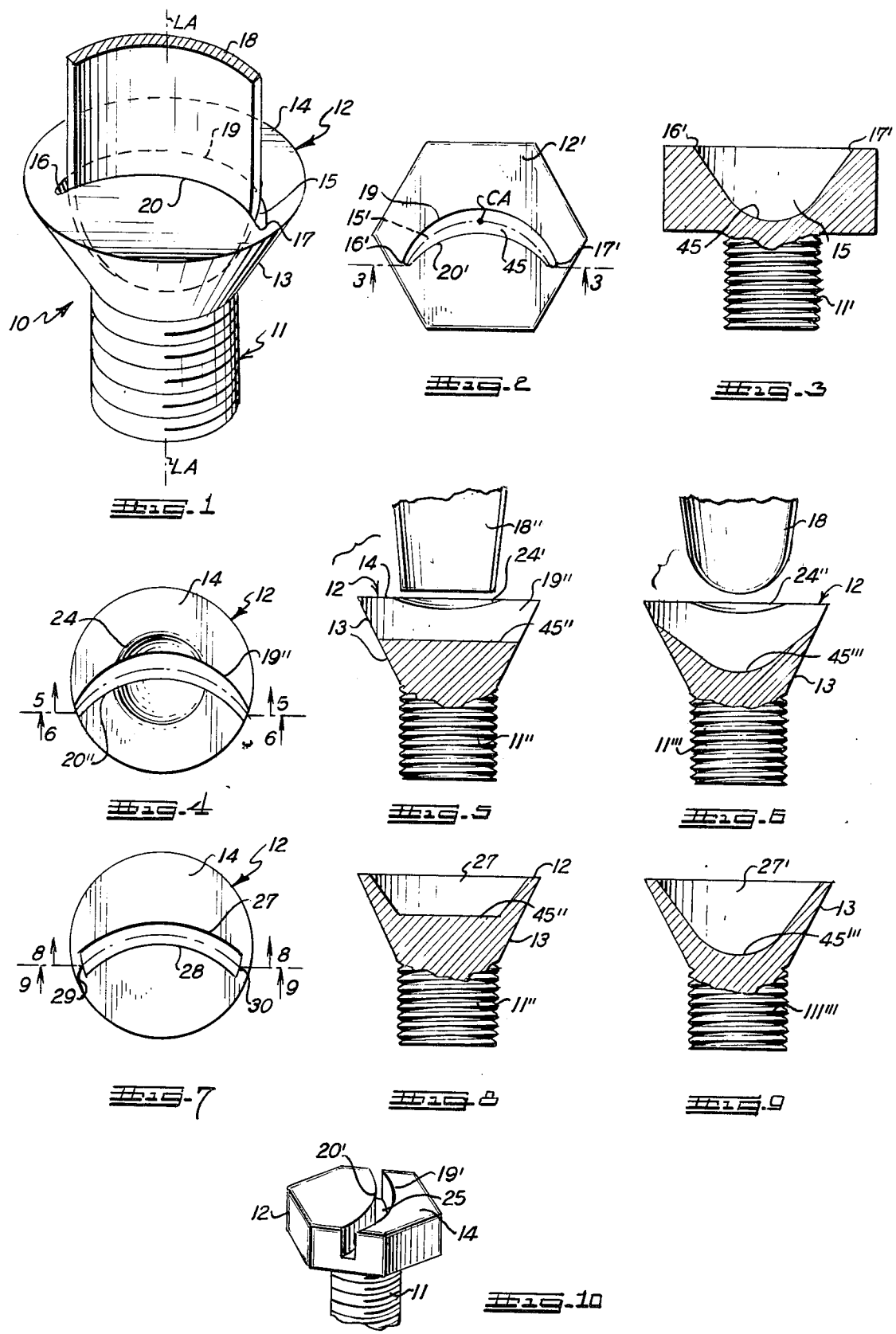

HIGH TORQUE FASTENER HEAD

This invention relates to improvements in the slots or grooves in the heads of the screws, bolts and fasteners —henceforth generally denominated as screws— including wood, metal and mechancial screws, consisting in a new and useful shape of the said slots, different in every way from those prevalent in the prior art, and the bits of screwdrivers adapted thereto; and, at the same time, of great simplicity and ease in manufacture.

The purpose of the improvements disclosed herein is to provide a slot or groove for the head of a fastener which will insure a firm grip on the bits of the adapted screwdrivers and avoid any slippage capable of damaging the slot and adjoining surfaces as well as the fingers of the holder, even under extreme torque.

The improved slot will avoid point contacts between the rectangular driver bit and the linear groove as well as the so-called Philips head common in most screws presently found on the market. Instead of the said spot or point contacts between driver and slot, the improvement contemplated in the present invention provides for extensive surface contacts, thereby distributing the torque applied with the driver more evenly throughout the body of the screw, thus allowing for greater torque, without the risk of injuring the slot (or user when manually driven) by deformation or slippage.

The advantages above mentioned are obtained by relatively simple changes in the design and shape of the slots found in screws of the prior art. The straight slot used in most screws is simply replaced by an arcuate groove, with special, but very important, characteristics.

The simplest and most elementary embodiment of my invention consists in replacing the linear or crossed slot of most screws in common use by a plain arcuate slot comprised of two concentric arcs of a circle, with vertical cylindrical sidewalls. This design, while a decided improvement over the prior art, is of limited use, since it operates most successfully with closed end slots.

The preferred and basic embodiment of the grooves in the screw heads of the present invention, applicable to all kinds of screws whether with open or closed end slots, is in the shape of what from a top plan view, would resemble a new or quarter moon. This arcuate groove consists of two arcs of circles of different radii, the outer arc being of a more restricted radius than the inner arc. The walls of the groove are to be of cylindrical design and perpendicular to the flat head of the screw; or, should the head not be flat, to a plane vertical to the axis of the shank of the screw.

the advantages of such a moon-like conformation of the slot are many and easily understandable as will be apparent to those skilled in the art. Since the inner and outer curvatures of the vertical walls of the slot converge at both ends in the shape of a wedge, the driver bit can never escape from the slot, open ended or not. In whatever direction the bit of the adapted screwdriver is turned, forcing the screw in or out, the wedgeshaped ends of both tools will hold together.

An additional variant in the embodiment of the slots of screw heads claimed in this invention, not necessarily to be used in all cases but important and desirable in some types of screws, consists in an arcuate depression or concavity in the bottom of the groove which will permit the adapted driver bit to penetrate more deeply into the body of the screw. This concave bottom of the arcuate slot will also improve the grasp of the driver on the screw and contribute to insuring a steady vertical positioning of the driver while in operation. Needless to say, the said concavity in the bottom of the groove may be of any arcuate shape, circular, elyptical or parabolic, as best adapted to the design of the screw head.

When the arcuate slot has a concave bottom as depicted above, another most useful device will consist in providing plane headed screws with a circular spherical depression around the axis of the shank, of a diameter greater than the width of the slot, but not in excess of the radius of the screw head. This additional improvement will greatly facilitate the positioning of the arcuate driver bit, especially when power driven, by turning within the circular depression and dropping naturally into the groove; thus speeding the operation and protecting the slot and adjoining surfaces from damage.

In summary, my arcuate slot in screw heads has the following advantages:

1. It is longer and consequently affords greater leverage than the linear or straight slot, allowing for maximum torque,
2. It provides surface-to-surface contacts between driver and slot instead of the point contacts between the linear slot and ordinary drivers of the prior art,
3. It allows for greater grasp of the arcuate driver on the groove,
r. When provided with a concave bottom, it permits deeper penetration of the arcuate driver into the body of the screw, solidly positioning the driver vertically into the slot,
5. When additionally provided with a circular depression in flat headed screws, it facilitates the insertion of the arcuate driver bit into the slot, by turning the driver within said concavity until it drops into the slot.

BRIEF DESCRIPTION OF THE DRAWINGS

FIG. 1 is a top perspective view of the preferred embodiment of my invention with closed end slot and having a driving tool in the slot, FIG. 2 is the top plan view, with closed end slot with a hex head, FIG. 3 is a cross-sectional view of the screw head of FIG. 1 taken on lines 3—3 through the slot, FIG. 4 is a top plan view of a modification with open end slot, FIG. 5 is a cross-sectional view taken on lines 5—5 of FIG. 4 of a straight bottomed slot and a portion of the driving implement about to be inserted, and FIG. 6 is a similar view with a concave bottomed slot taken on lines 6—6 of FIG. 4, FIG. 7 is a top plan view of a less preferred embodiment of the invention wherein the slot is closed ended and formed by two parallel and non-meeting cylindrical surfaces, FIG. 8 is a cross-sectional view, taken on lines 8—8 of FIG. 7 of a straight bottomed slot and FIG. 9 is a cross-sectional view taken on lines 9—9 of FIG. 7 and shows the concave shaped bottom, and FIG. 10 is a perspective view of a hex head fastener having an open ended slot incorporating the invention.

DETAILED DESCRIPTION OF THE INVENTION

FIG. 1 is a perspective view of a screw type fastener 10 having a threaded shank or shaft 11, round head 12 with tapering walls 13 integral with the shank or shaft part 11. In the top surface 14 of head 12 is slot 15 with closed ends 16 and 17. While the upper surface 14 of head 12 is flat, it could just as well be domed or curved. Slot 15 intersects the longitudinal axis LA of shank or shaft 11 and, as shown in FIG. 1, has received therein the bit end 18 of a screwdriver-type implement. It will be appreciated that as shown in FIG. 2, the head 12' may be hex head or any other shape. This permits the tool to be driven by conventional wrench-type drive implements which may not utilize the slot according to the invention herein. FIG. 3 is a cross-sectional view taken on lines 3-3 of FIG. 2 and shows the slot 15 as having a concave bottom wall 20. The slot shown in FIGS. 1,2, and 3 is constituted by two cylindrical side walls of different radii, said cylindrical side walls being parallel to the longitudinal axis LA of the shank with the outer wall 20 being of greater radii than the inner wall 19 in a manner that both walls will converge within the boundaries of the screw head so that developing torque forces, when applied by the driving bit 18 of the screwdriver-type implement against one or the other side walls, and having essentially the same cross-sectional configuration of that part of the slot 15 which the bit occupies, always insures the full surface contact between the driver 18 and the slot when driving the screws in or out.

In the embodiment shown in FIGS. 4, 5, and 6, the slot is formed by two cylindrical side walls 19" and 20" which side walls converge beyond the boundaries of the screw head 12. In FIG. 5, the bottom of the slot 20" is illustrated as being flat whereas in FIG. 6 the bottom of the slot is concave.

In FIG. 4, the top 14 of screw head 12 is flat and has a slight circular depression or dimple 24 in the center of the slot, around the axis of shank 11" and having a diameter which is greater than the width of the slot 15 but substantially less than the diameter of the screw head. Such recesses or dimples are disclosed in Vaughan U.S. Pat. No. 3,540,342 and permit utilization of the novel slot disclosed herein in combination with power drivers to thereby facilitate "seeking" of the slot by the arcuate tip of the driving blade and is, in effect, a self-aligning high torque screw slot which is described in detail in Vaughan U.S. Pat. No. 3,540,342.

FIG. 7 is a top plan view of a less preferred embodiment of the invention wherein the slot is constituted of two parallel cylindrical surfaces 27 and 28 connected by elements 29 and 30 to form an arcuate slot closed within the boundaries of the top surface 14 of screw head 12. In the case of this slot, without ends 29 and 30 being closed, the bit or implement which would be recieved within this slot could, upon application of torque forces, slides out. FIG. 8 is a cross-sectional view taken on lines 8—8 of FIG. 7 showing the slot with a flat bottom whereas FIG. 9 is a cross-sectional view taken on lines 9—9 of FIG. 7 showing the slot with a concave bottom 20'''.

The embodiment shown in FIG. 10 is a perspective view of a modification of the embodiment shown in FIG. 2 wherein the screw head 12 is hexagonally shaped and the walls 19' and 20' converge beyond the boundaries of the screw head.

When the arcuate slot, as disclosed herein, is provided with a concabe bottom as shown in FIGS. 3, 5 and 9, the driving bit penetrates deeper into the screw head and improves the grasp of the screw head on the driving bit.

SUMMARY

In summary, there is provided an improved fastener having a longitudinal axis and an implement head which includes as an implement driving slot, a pair of spaced, arcuate walls defining the arcuate slot with the arcuate slot intersecting and being transverse to the longitudinal axis of the fastener body. Torque forces applied by an arcuate torquing implement inserted in the arcuate slot, causes an opposite set of reaction forces to bear on at least one distributed surface area. In the preferred embodiment, the arcuate walls are contained in cylindrical surfaces of revolution which intersect each other and the shape of the driving implement corresponds exactly to the arcuate shape of the slot with the least amount of tolerance that manufacturing will permit. The extensive surface contact provided by the arcuate surfaces distributes the torque applied by the driver more evenly throughout the body of the screw thus allowing for a greater torque without the risk of injuring the slot (or user) by deformation or slippage.

While I have shown and described a number of different embodiments along with a preferred embodiment, it is believed that the invention is capable of a number of other modifications without departing from the spirit and scope thereof as defined in the claims appended hereto .

I claim:

1. A fastener having a threaded shank portion and an integral head portion, said head portion having an arcuate slot formed therein, said arcuate slot intersecting the longitudinal axis of said shank portion, said slot consisting of a pair of arcuate side walls, each side wall being on the opposite sides, respectively, of said longitudinal axis and parallel thereto so that a line traversing the center of said slot and intersecting said longitudinal axis is arcuate, each said arcuate side wall being contained within a cylindrical surface of revolution, said surface of revolution converging towards one another at each end thereof whereby, for a given screw head size, said slot is longer and affords an extensive area of arcuate, surface to surface contact between a correspondingly arcuate driving implement to thereby distribute torque forces more evenly throughout the body of the fastener, and thereby allowing a greater torque force to be applied without the risk of injuring the slot or user by deformation or slippage of the implement in the slot.

2. The invention in claim 1 wherein the said cylindrical side walls of the slot converge outside of the perimeter of the head of the fastener and said slot is adapted to receive a driving implement of a shape corresponding exactly to the arcuate shape of the slot, with the least tolerance that manufacturing will permit.

3. the invention in claim 1 wherein the said arcuate slot consists of two converging cylindrical side walls, said converging cylindrical side walls converge and terminate within the perimeter of the head of said fastener.

4. The invention in claim 1 wherein the bottom of the said arcuate slot is concave.

5. The invention in claim 4 wherein said fastener has a flat head, and includes a circular depression or cavity around the axis of the shank, of a diameter greater than the width of the slot at that point, but substantially less than the diameter of the head of the fastener.

* * * * *